United States Patent [19]
White

[11] 3,814,226
[45] June 4, 1974

[54] CLUTCH PISTON ASSEMBLY HAVING UNITARY ELASTOMERIC CUSHION RING AND LIP SEAL

[75] Inventor: Charles R. White, Royal Oak, Mich.

[73] Assignee: General Motors Corporation, Detroit, Mich.

[22] Filed: Mar. 19, 1973

[21] Appl. No.: 342,514

[52] U.S. Cl.......... 192/85 AA, 192/109 A, 188/366, 92/85
[51] Int. Cl............................................ F16d 25/00
[58] Field of Search......... 192/109 A, 85 R, 85 AA; 188/366; 92/107, 108, 249, 253, 85

[56] References Cited
UNITED STATES PATENTS
| | | | |
|---|---|---|---|
| 2,932,280 | 4/1960 | Vielmo | 92/249 X |
| 2,984,529 | 5/1961 | Dailey | 92/85 X |
| 3,321,056 | 5/1967 | Winchell et al. | 192/85 R |
| 3,353,641 | 11/1967 | Chana | 192/109 A X |

Primary Examiner—Benjamin W. Wyche
Attorney, Agent, or Firm—Charles R. White

[57] ABSTRACT

This piston assembly for selectively engaging a friction drive establishing device incorporates an annular sheet metal shell which has inner and outer rims connected by an intermediate channel portion. There is a one-piece elastomeric cushion ring and lip seal unit molded directly on the shell adjacent to the outer rim. The cushion ring and lip seal are disposed on opposite sides of the shell and are joined by connector portions extending through openings therein. As the piston assembly strokes in its bore the cushion ring initially engages the friction device and deflects to accumulate apply force to cushion the subsequent engagement of the piston with the friction device and to calibrate the torque capacity of the friction device.

5 Claims, 4 Drawing Figures

PATENTED JUN 4 1974 3,814,226

CLUTCH PISTON ASSEMBLY HAVING UNITARY ELASTOMERIC CUSHION RING AND LIP SEAL

This invention relates to hydraulically operated piston assemblies for transmissions and more particularly to a new and improved piston assembly having a unitary elastomeric cushion ring and lip seal unit which is molded directly on the body of the piston.

To reduce weight and cost, piston assemblies incorporating piston shells stamped from sheet metal and provided with elastomeric lip seals for sealing the piston in the bore have been utilized in some of the more recent transmission designs. While these piston assemblies have provided for improved transmissions they are frequently employed with multi-plate friction clutches and brake units having metallic cushion springs that provide the desired cushioning of the piston as it strokes in the bore to engage the friction unit.

With this invention the cushion springs previously employed with these friction clutch and brake units are replaced by new and imporved elastomeric cushion rings which are mounted on the sheet metal pistons. These cushion rings make initial contact with the multi-plate friction unit as the pistons stroke to prevent shock loading of the friction discs, calibrate clutch or brake torque capacity and provide for smooth transmission shifts. Preferably this cushion ring is molded directly onto the piston shell in conjunction with a lip seal to provide a one-piece elastomeric cushioning and sealing unit whch grips a portion of the shell therebetween to eliminate the requirement for special mounting grooves or the bonding of these elastomer elements to the shell.

In the preferred embodiment of this invention there is a new and improved piston assembly comprising a piston shell stamped from sheet metal formed with an outer annular rim and an adjacent series of axially extending holes. The cushion and lip seal unit is injection molded in one molding operation from a heat stabilized polyester elastomer or other suitable elastomeric material directly onto the shell with the annular sealing lip formed on one side of the shell connected to the annular cushion ring formed on the other side of the shell by elastomer material which flows through the openings during the molding process. The molded seals have an annular lip which extends radially beyond the outer limit of the shell to provide good sealing contact with the walls of the piston bore while the axially extending cushion ring terminates in a contact surface that is disposed a predetermined distance beyond a contact face of the shell. When the piston chamber is charged with apply pressure, the piston will move forward in the bore with the cushion ring initially engaging the friction unit. On continued apply movement of the piston, the cushion ring deflects calibrating the torque capacity of the friction unit and cushioning the direct engagement of the contact face of the piston with the friction device. At full engagement the contact faces of the cushioning device and the piston are coplanar and the friction unit is at full capacity engagement.

It is a feature, object and advantage of this invention to provide a new and improved piston assembly for a friction drive establishing device in which an elastomeric cushion ring and lip seal unit is molded directly on opposite sides of a piston body and is retained thereon by an intermediate portion extending through spaced openings formed in the piston body.

It is another feature, object and advantage of this invention to provide a new and improved piston assembly for a friction drive establishing device which incorporates an annular metallic shell having an axially extending outer rim portion that terminates in an end contact face, and an elastomeric contact cushion for initially engaging the friction device which is joined with an elastomeric fluid seal by connector portions that extend through spaced openings formed in the shell.

Another feature, object and advantage of this invention is to provide a new and improved elastomeric cusion ring for a stamped sheet metal piston which produces the cushioned and calibrated engagement of a multi-plate friction device and which eliminates the requirement for waved and coil type cushion springs.

These and other features, objects and advantages of this invention will become more apparent from the following detailed description and drawing in which.

Figure 1:
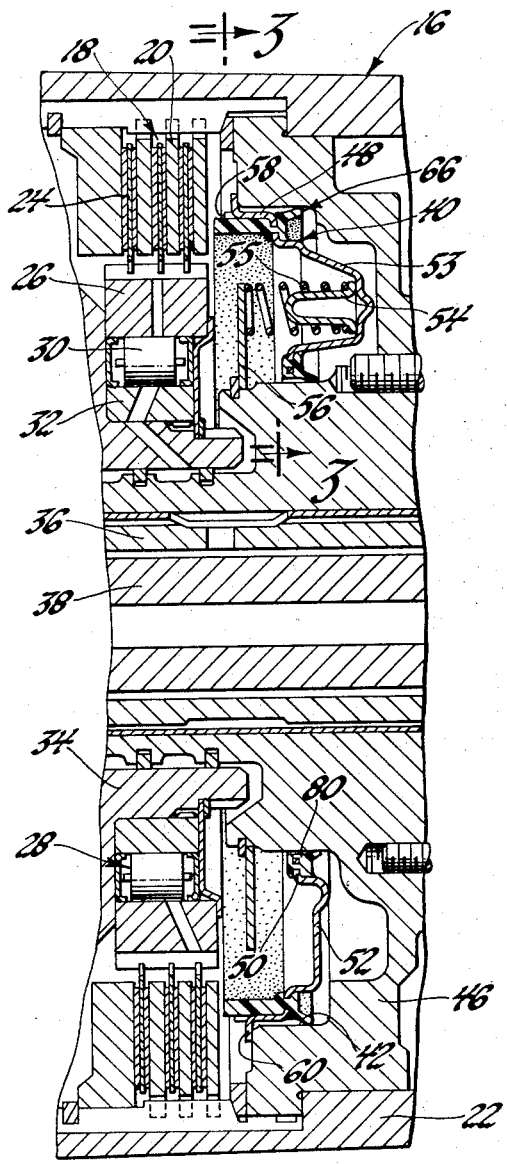
FIG. 1 is a side sectional view of a multi-plate friction brake in a transmission.

Turning now to FIG. 1, there is illustrated a portion of a transmission 16 which in its entirety may be the same as the transmission disclosed in the patent to Winchell et al. U.S. Pat. No. 3,321,056, issued May 23, 1967. Transmission 16 includes a multi-plate intermediate brake 18 which has annular steel plates 20 splined to the inside of the transmission case 22 interleaved with friction plates 24 faced with friction material and splined to the outer race 26 of a one-way brake 28. The one-way brake has conventional rollers 30 disposed between the outer race and an inner annular race 32 that is splined to a rotatable drum 34. Drum 34 is drivingly connected to a sleeve shaft 36 which extends axially in the transmission and which surrounds the axially extending intermediate shaft 38. Sleeve shaft 36 and intermediate shaft 38 are operatively connected to a planetary gear set which is conditioned for a predetermined drive ratio when brake 18 and the one-way brake 28 are engaged as described in the Winchell et al patent referenced above.

The multi-plate friction brake 18 is selectively engaged by a hydraulically actuated piston assembly 40 mounted for axial movement in an annular bore 42 formed in a fixed center support 46. This piston assembly comprises an annular piston body or shell stamped from sheet metal stock formed with outer and inner annular rims 48 and 50 connected by intermediate channel portion 52 to slidably fit in the bore. The channel portion is formed with depressed spaced pockets 53 in which are mounted spring retainers 54 that hold helical piston return sprngs 55 therein. These return springs are seated on a retaining ring 56 fixed to the center support 46 and move the piston assembly to an off or disengaged position from brake 18 when controls not shown exhaust apply pressure from the apply chamber formed by the piston assembly and bore 42. The outer rim 48 of the piston assembly extends axially and terminates in a contact face 58 for engaging the multiple disc brake 18. Struck radially upward from the contact face 58 are stops 60 suitably spaced around the outer periphery of the shell to engage a stop shoulder formed by the face of the center support to limit the axial movement of the piston assembly 40 into the bore as the return spring moves it to an off position in response to exhaust of fluid pressure from the apply chamber.

Figure 3:
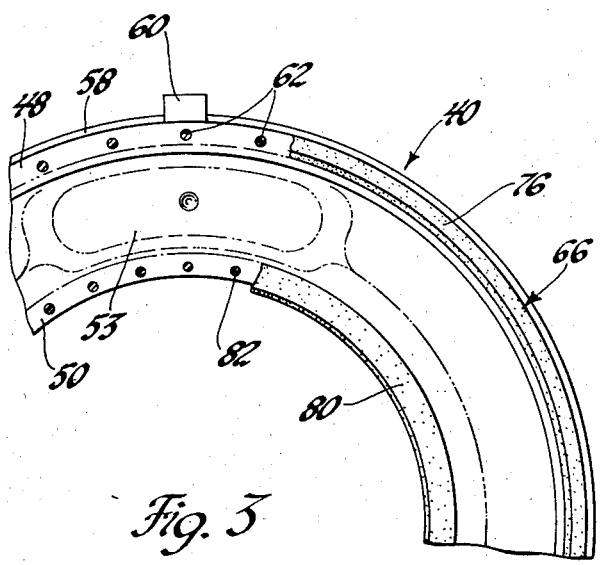
FIG. 3 is a view taken along line 3—3 of FIG. 1 with parts broken away and some parts removed.

As shown in FIGS. 1 and 3, the piston shell is provided with openings 62 arranged in a circle adjacent to the outer rim to provide for the support of the special elastomeric cushion ring and lip seal unit 66 of this invention onto the shell. In the preferred embodiment of this unit a suitable heat stabilized polyester elastomer is injection molded directly onto the piston shell to form a lip seal portion 68 on the outside of the shell which terminates in an annular fluid sealing lip 70 that is adapted to contact the outer wall of the bore 42 to provide for the fluid sealing between the piston and the bore. Also formed during this molding is the cushion ring 72 connected to the lip seal by the elastomeric material extending through the openings 62. In the relaxed state the cushion ring 72 terminates in an annular contact face 76 which is disposed a short distance beyond the contact face 58 of the piston shell so that initial engagement of the piston assembly with brake 18 is made by the cushion ring. The material of the cushion ring has sufficient yieldability so that the ring deflects under load accumulating apply energy and cushioning the engagement of the contact face 58 with the friction brake 18. After full engagement is accomplished, the contact faces 58 and 76 are aligned and in contact with the first plate of the brake 18. When the brake is subsequently released and the piston assembly moves toward the off position, the force of restitution of the deformed cushon ring returns it to its original size and shape.

To provide a seal for the inner rims 50 an annular lip seal 80 is injection molded to the shell with elastomer material flowing through the circular pattern of opening 82 formed in the rims 50.

Figure 4:
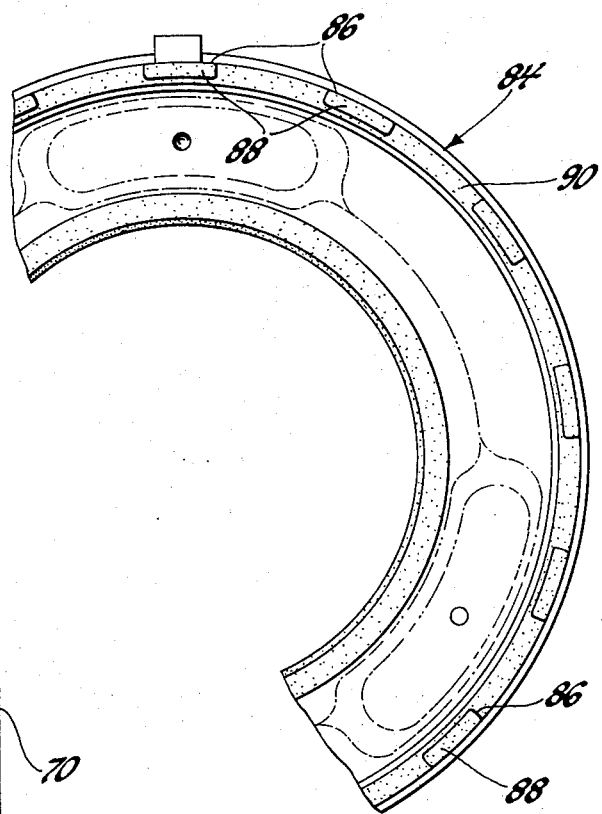
FIG. 4 is a view similar to FIG. 3 but showing an alternate construction of this invention.
Figure 2:
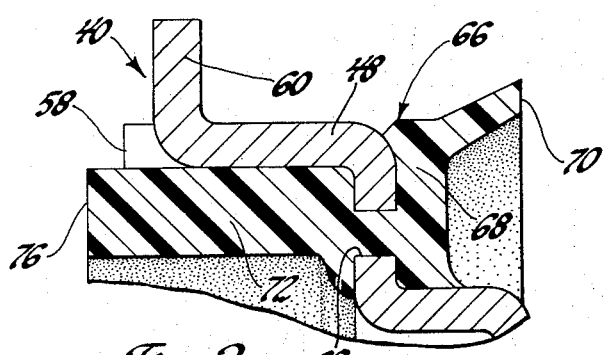
FIG. 2 is an enlarged view of a portion of FIG. 1.

In the second embodiment of the invention shown in FIG. 4, the cushion ring and lip seal unit 84 is similar to the corresponding unit of the preferred embodiment but with the cushion ring formed with finger-like extensions 86 which terminate in flat spaced contact faces 88 rather than the annular contact face 76 in the first embodiment. The contact faces 88 are disposed outwardly from the contact face 90 of the piston shell as in the first embodiment. With the spaced contact faces the amount of cushioning provided by the cushion ring is tailored to vary the calibration of the engagement of brake 18. The other components of this embodiment are the same as the first embodiment and therefore need not be further described.

The cushion ring and lip seal units 66 and 84 and the inner lip seal are formed in one injection molding operation and are secured to the stamped piston with minimized special preparation of the shell and without the use of adhesives, annular retainer grooves or other mechanical fasteners. The gripping action afforded by the cushion ring and the lip seal disposed in a side by side relationship provides for the improved securing of these components to the shell, long service and improved operation.

While preferred embodiments of this invention have been shown and described to illustrate the invention, various changes and modifications may be made without departing from the scope of the invention as set forth in the following claims.

I claim:

1. In a power transmission, a friction drive establishing device for controlling the flow of power through said transmission, a hydraulically operated piston assembly for selectively engaging said friction device, a piston housing, said piston housing having a bore therein for receiving said piston assembly, said piston assembly having an annular shell with inner and outer rims and an apply face for directly engaging said friction device, said shell having a plurality of spaced openings extending axially therethrough adjacent to said outer rim, cushioning and sealing means of homogenous elastomeric material for said piston assembly, said cushioning and sealing means comprising an annular fluid sealing lip formed on the outside of said shell that extends beyond the circumference of said shell for sealing engagement with an outer wall of said bore and an axially extending cushion formed on the inside of said shell that projects beyond said apply face for initially contacting said friction device in response to predetermined axial movement of said piston in said bore toward said friction device and further comprising connecting means extending through said openings to join said sealing lip and said cushion to thereby secure said cushioning and sealing means to said shell.

2. A hydraulically operated piston assembly for a friction drive establishing device comprising a thin walled annular shell of sheet metal having annular inner and outer rims to slidably fit within a bore in a housing, said outer rim having a contact face on the end thereof for engaging said friction device, said shell having an intermediate portion which interconnects said inner and outer rims, said shell further having a plurality of spaced openings adjacent to said outer rim, one piece cushioning and sealing means of elastomeric material for said shell, said cushioning and sealing means comprising a cushion body having an end face disposed axially outward from the contact face of said rim when in a relaxed state and an annular fluid seal disposed on the outside of said shell and iterconnecting means extending through and filling said openings to integrally join said cushion body and seal and thereby secure said cushioning and sealing means to said shell.

3. In a power transmitting device, a friction device having separate friction means selectively engageable to connect relatively rotatable parts of the power transmitting device, a housing, piston assembly means movably mounted in said housing for moving said friction means into frictional engagement with each other by applying a load thereto, said piston assembly means comprising a metallic annular shell having an axially extending rim terminating in a contact surface for directly engaging a first of said friction means, a plurality of spaced openings extending through said shell disposed adjacent to said rim, a resilient cushion of elastomeric material having a main body with contact surface means offset outwardly from the contact surface of said shell to initially contact and cushion the engagement of said contact surface of said rim and a first of said friction means while transmitting an apply load to said friction device, said cushion further having a retainer portion formed on the outside of said shell and intermediate connector portions which extend through said openings to integrally join said main body of said cushion and said retainer portion and thereby secure said cushion to said shell.

4. The power transmitting device defined in claim 3 wherein said contact surface means of said resilient cushion comprises a flat annular face for making annular contact with a first of said friction means to provide for even and cushioned loading of the friction device in response to apply movement of said piston assemly assembly in said housing.

5. The power transmitting device defined in claim 3 wherein said body of said resilient cushion comprises a plurality of axially projecting portions extending outwardly from said shell and said contact surface means of said resilient cushion comprises spaced contact faces formed by the ends of said axially projecting portions.

* * * * *